United States Patent

Laubenstein

[15] 3,659,359

[45] May 2, 1972

[54] MULTISENSORY LEARNING AID DEVICE

[72] Inventor: Priscilla Laubenstein, 15 Half Mile Road, Barrington, R.I. 02806

[22] Filed: Nov. 3, 1970

[21] Appl. No.: 86,546

[52] U.S. Cl. ................................................. 35/70, 35/31 G
[51] Int. Cl. ..................................................... G09b 23/02
[58] Field of Search .............. 35/31 G, 7 O, 31 R, 31 D, 31 F, 35/32

[56] References Cited

UNITED STATES PATENTS

| | | | |
|---|---|---|---|
| 1,594,376 | 8/1926 | Passmore | 35/31 F UX |
| 3,381,394 | 5/1968 | Munro | 35/31 F |

FOREIGN PATENTS OR APPLICATIONS

| | | | |
|---|---|---|---|
| 768,450 | 2/1957 | Great Britain | 35/31 G |
| 175,049 | 5/1935 | Switzerland | 35/31 G |

*Primary Examiner*—Harland S. Skogquist
*Attorney*—Salter & Michaelson

[57] ABSTRACT

A multisensory learning aid device comprising a series of three-dimensional blocks representing the numerals one through nine and zero, each block having a compartment therein for each combination of numbers that may be added to arrive at the numeral represented by the block, each compartment having a pair of rows of recesses therein with the number of recesses in each row corresponding to the numbers which may be added to arrive at the numeral represented by the block, an article removably positioned in each recess with all of the articles in each block being of the same color and significance but being of a different color and significance from all of the articles in each other block, and closure means for each compartment.

10 Claims, 4 Drawing Figures

PATENTED MAY 2 1972

3,659,359

INVENTOR.
PRISCILLA LAUBENSTEIN
BY
*Salter & Michaelson*

MULTISENSORY LEARNING AID DEVICE

BACKGROUND AND SUMMARY OF THE INVENTION

There has long been a need for an effective multisensory educational aid for pre-school and kindergarten children, as well as children of a somewhat older age who have experienced difficulty in learning simple mathematical concepts, color recognition and the like. Devices of this general type have heretofore been constructed and used, but such prior devices were relatively limited in their application as a learning aid. Expressed differently, such prior devices in most cases were directed to one function, or at most, a very limited number of functions, whereas experience has shown that a learning device of this type is far more beneficial and meaningful where the aid integrates a wide variety of sensory perceptions.

It is therefore a primary object of my invention to provide a learning aid device which is highly beneficial in teaching young children their numerals, rational numbers, and simple addition and subtraction of numbers totaling one through ten. This device will also aid in the discovery of the concepts of conservation and reversibility.

A further object of my invention is the provision of a learning aid device which also aids in color recognition by young children and in correlation of colors with basic articles, such as fruits or vegetables, thereby aiding categorization of common objects.

A further object is the provision of a device of the character described wherein physical manipulation is involved in the use thereof by children, whereby the child learns numerals, simple addition, substraction, etc., through concrete multisensory physical experiences.

A further object is the provision of a learning aid of the character described that is autotelic or self-teaching in nature.

A further object is the provision of a learning aid of the character described that is relatively simple and inexpensive to manufacture but which nevertheless has motivational appeal as well as an attractive and pleasing appearance to children and hence, in addition to functioning as a multisensory learning aid, simultaneously functions as a play device for children, thus having play value as well as educational value.

Other objects, features and advantages of the invention will become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
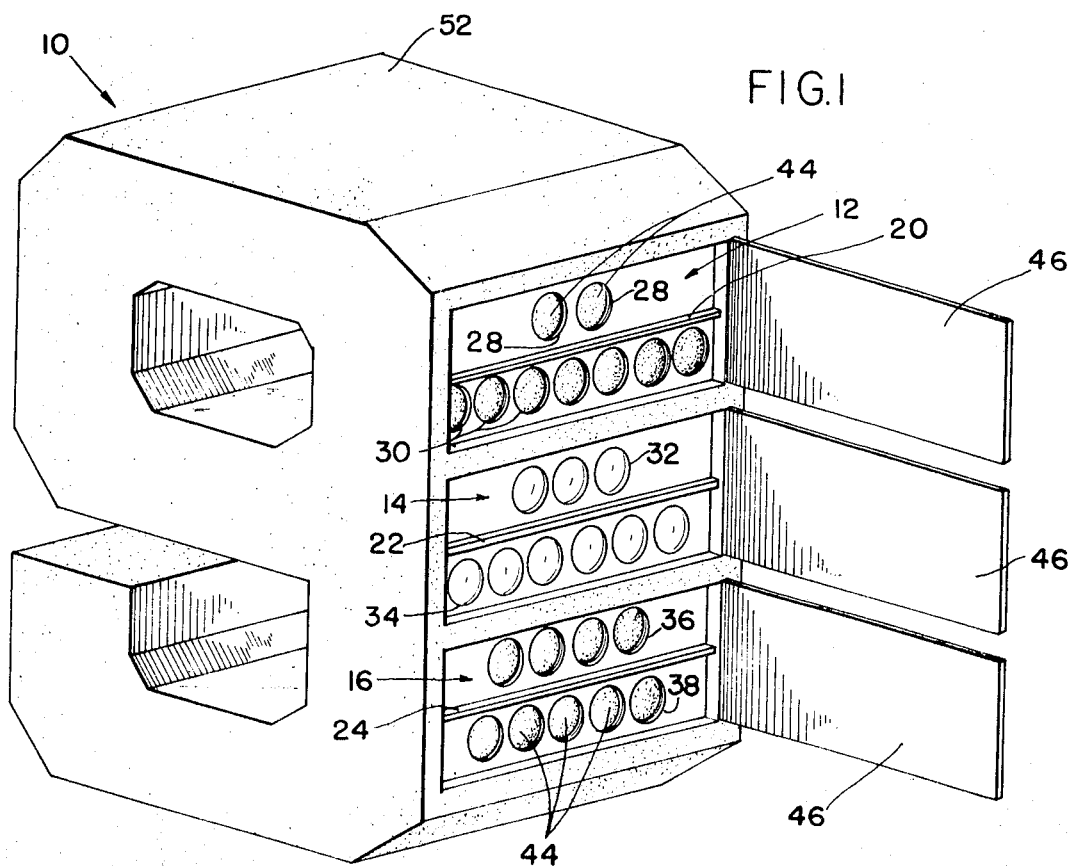
FIG. 1 is a right-hand perspective view of one of the numeral blocks that forms a part of my invention.

In carrying out the objectives of my invention, I provide a series of three-dimensional blocks configured so as to represent numerals from one through nine and zero. For purposes of simplicity, only one such block is shown in the drawings, it being understood, however, that the other blocks of the series are all similar in construction, differing from the illustrated block by virtue of the different numerals represented.

Figure 2:
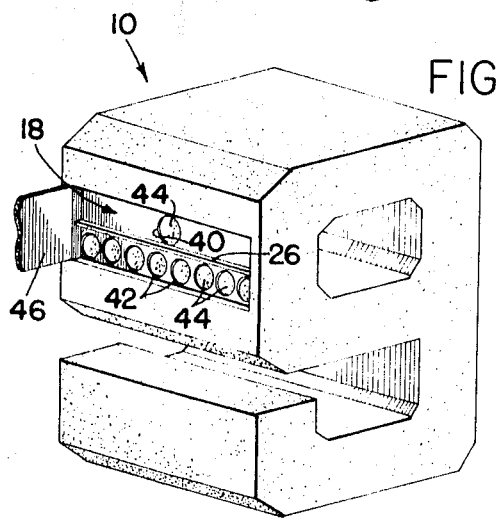
FIG. 2 is a left-hand perspective view, on a reduced scale, of the block shown in FIG. 1.

Thus, in FIG. 1 there is shown generally at 10 a block configures so as to represent the numeral nine. As will be seen, the block is three dimensional in nature and may be constructed of any suitable material, such as wood, molded plastic or the like. The block 10 is provided with a plurality of compartments 12, 14, 16 and 18, it being noted that three of the compartments are located along one side of the block, while the other compartment is located on the opposite side thereof, as shown most clearly in FIG. 2. Within each compartment is a horizontally disposed partition or shelf 20, 22, 24, 26, each of said shelves dividing its respective compartment into upper and lower sections. The upper section in compartment 12 is provided with a pair of recesses 28, while the lower section of said compartment is provided with seven similar recesses 30. The upper section of compartment 14 is provided with three similar recesses 32, while the lower section of said compartment is provided with six recesses 34. Likewise, the compartment 16 is provided with four similar recesses 36 in its upper section and with five similar recesses 38 in its lower section. Lastly, the compartment 18 is provided with a single recess 40 in its upper section and with eight similar recesses 42 in its lower section.

Within each of the aforesaid recesses 28 through 42 there is positioned an article 44, it being understood that all of the recesses receive identical articles which may represent a fruit or a vegetable, and which in the case of the illustrated block represent lemons, all having a distinctive light-lemon color. The articles 44 are preferably replicas of actual lemons and may be of molded plastic construction or the like. It will be understood that the articles 44 are freely positionable within the aforesaid recesses, the recesses being dimensioned so that only one article may be received therein, but so that the article may easily be inserted in the recess and removed therefrom.

Figure 3:
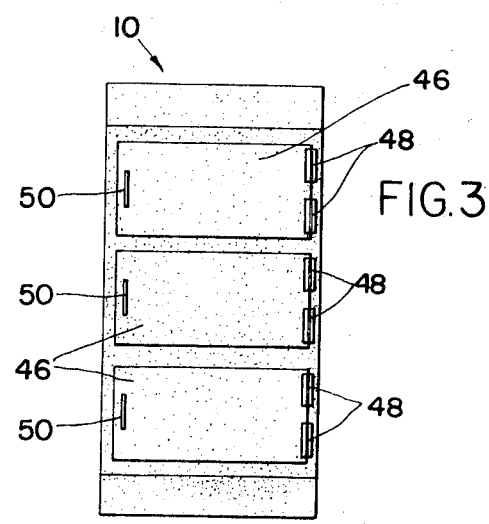
FIG. 3 is a right-hand end view, on a reduced scale, of the block shown in FIG. 1 with the compartment doors shown in closed position.
Figure 4:
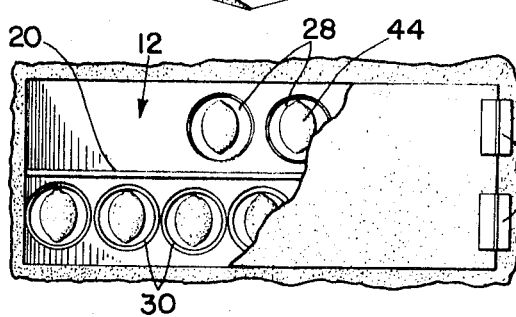
FIG. 4 is a fragmentary elevational view, on an enlarged scale, showing one of the compartments that forms a part of my invention.

Doors 46 are provided for each of the compartments, it being understood that the doors are movable between an open position, as illustrated in FIG. 3. Preferably, the doors are hingedly mounted, as at 48, although other suitable forms of mounting may be employed, the important thing being that the door be movable between a closed and an open position. Handles 50 are provided on the doors 46 to facilitate opening and closing thereof. To aid in the child's recognition and learning of the numerals, all of the odd-numbered blocks have a rough texture on their outer surface, as at 52, while all of the even-numbered blocks have a smooth outer surface. Obviously, this arrangement could be reversed, i.e., the even-numbered blocks could be provided with the rough-textured surface and the odd-numbered blocks could be provided with the smooth surface.

It will be understood that four compartments have been provided in the illustrated block 10, because there are four combinations of numbers which, when added to each other, arrive at the number nine. Thus, the compartment 12 corresponds to the equation $2 + 7 = 9$, or $9 - 2 = 7$, $9 - 7 = 2$; while compartment 14 corresponds to the equation $3 + 6 = 9$ or its reverse etc. Likewise, the compartment 16 corresponds to the equation $4 + 5 = 9$; while the compartment 18 represents the equation $1 + 8 = 9$. The other blocks in the series, not illustrated, are similarly constructed to the illustrated block 10, it being understood that the numeral-8 block will similarly have four compartments therein representing the four combinations of numbers which when added arrive at the total eight, namely, $1 + 7$, $2 + 6$, $3 + 5$, and $4 + 4$. The numeral 7 block has only three compartments therein, representing $1 + 6$, $2 + 5$, and $3 + 4$. Likewise, the numeral-6 block has three compartments therein, representing $1 + 5$, $2 + 4$, and $3 + 3$. The numeral-5 block has only two compartments, representing $1 + 4$ and $2 + 3$; while the numeral-4 block likewise has two compartments, representing $1 + 3$ and $2 + 2$. The 1, 2 and 3 blocks, as well as the 0 block, have only one compartment therein. Specifically, the compartment in the numeral-3 block represents $1 + 2$; while the compartment in the numeral-2 block represents $1 + 1$. The compartment in the numeral-1 block is not partitioned, as are the compartments in the numerals two through nine blocks, since obviously only one article will be present in the numeral-one block. Likewise, the 0 block has no partition therein, and is actually an empty set to correspond to 0.

It is a further object of my invention that each of the blocks be of a different color to correspond to the color of the article contained in said block. Thus, as previously described, the illustrated block 10 is a light-lemon color to correspond to the lemons 44 positioned therein. The numeral-8 block may be provided with cherries as the articles located therein and hence would be colored dark red. The numeral-7 block may have grapes therein and hence would be colored light green, while the numeral-6 block may be provided with plums and hence would be colored purple. The numeral-5 block may have peaches as the articles positioned therein and hence would be colored a peach color; while the numeral-4 block may be provided with pears and hence would be colored green. The numeral-3 block may have oranges therein and hence would be colored orange; while the numeral-2 block may comprise apples and hence would be colored red. The numeral-1 block may have a banana therein and hence would be colored yellow; while the 0 block could be colored white. It will be understood, however, that the colors and fruits heretofore mentioned are purely by way of example, and other fruits and colors could be employed, or other articles, such as vegetables, for example, could likewise be employed with their corresponding colors. The important thing is that each block have articles therein which are identical, the block being colored to correspond to the articles. The color and character of each article in each block differs from that of each other block, although the articles belong to a known category, such as all being fruits, vegetables or the like.

In order to increase and enhance the tactile and matching functions of my invention, it has been found desirable to provide a corresponding texture on the articles provided for a given block. Thus, if the odd blocks have a roughened texture, then the articles within said blocks would have a similar roughened texture, etc. Also, in order to teach the concept of ordering or seriation, the blocks may increase in size from zero to nine.

Thus it will be seen that there has been provided in accordance with my invention a device which permits young children of pre-school or kindergarten age or older children with learning disabilities to self-learn through actual concrete experiences, numerals, rational numbers, simple addition and its reverse, subtraction, as well as combination of numbers, categorization of fruits, vegetables or the like, and colors pertaining thereto. Since the device is manipulative in nature, the child has an opportunity to exercise sense of touch, as well as visual and auditory senses. Also involved are the concepts of conservation, reversibility and classification.

While there is shown and described herein certain specific structure embodying the invention, it will be manifest to those skilled in the art that various modifications and rearrangements of the parts may be made without departing from the spirit and scope of the underlying inventive concept and the same is not limited to the particular forms herein shown and described except insofar as indicated by the scope of the appended claims.

What is claimed is:

1. A multisensory learning aid device comprising a series of three-dimensional blocks each configured to simulate a numeral from one through nine, including zero, each block having a compartment therein for each combination of two numbers that may be added to arrive at the numeral represented by the block.

2. In the device of claim 1, each compartment in the blocks for the numerals two through nine having two rows of recesses formed therein, the number of recesses in each row corresponding to numbers which may be added to arrive at the numeral represented by the block, and a plurality of articles adapted to fit singly and snugly in said recesses.

3. In the device of claim 2, the articles in each numeral block being the same in significance and color, but being different in significance and color from the articles in each other numeral block.

4. In the device of claim 2, the numeral-1 block having a single compartment with a single recess therein, and a single article adapted to be received in said recess.

5. In the device of claim 4, the zero block having a single compartment with no recesses or article therein.

6. In the device of claim 5, all of said compartments having a closure movable between an open position wherein the interior of said compartment is exposed, and a closed position.

7. In the device of claim 6, said closures being hingedly mounted on said blocks.

8. In the device of claim 1, said odd-numbered blocks having a rough textured surface and said even-numbered blocks having a smooth textured surface, or vice versa.

9. In the device of claim 1, each compartment in the blocks for the numerals two through nine having a horizontal shelf partitioning the compartment into upper and lower sections, and a plurality of articles positioned in said sections, the number of articles in each section corresponding to the numbers which when added total up to the numeral represented by the block.

10. In the device of claim 9, the zero and numeral-1 block each having a single unpartitioned compartment, the compartment in the zero block having no articles therein, and the compartment in the numeral-one block having one said article therein.

* * * * *